United States Patent
Al-Salman et al.

(10) Patent No.: US 9,875,670 B2
(45) Date of Patent: Jan. 23, 2018

(54) BRAILLE COPY MACHINE USING IMAGE PROCESSING TECHNIQUES

(75) Inventors: AbdulMalik S. Al-Salman, Riyadh (SA); Ali Y. El-Zaart, Riyadh (SA); Khalid A. Al-Hokail, Riyadh (SA); Yousef A. Al-Suhaibani, Riyadh (SA); AbdulAziz O. AlQabbany, Riyadh (SA)

(73) Assignee: KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 2057 days.

(21) Appl. No.: 12/832,612

(22) Filed: Jul. 8, 2010

(65) Prior Publication Data

US 2012/0008151 A1 Jan. 12, 2012

(51) Int. Cl.
| | |
|---|---|
| G06K 15/02 | (2006.01) |
| G09B 21/00 | (2006.01) |
| B41J 3/32 | (2006.01) |
| G09B 21/02 | (2006.01) |

(52) U.S. Cl.
CPC .............. G09B 21/003 (2013.01); B41J 3/32 (2013.01); G09B 21/02 (2013.01)

(58) Field of Classification Search
CPC ........... B41J 3/32; G09B 21/003; G09B 21/02
USPC ........................................................ 358/1.2
See application file for complete search history.

(56) References Cited

U.S. PATENT DOCUMENTS

| | | | |
|---|---|---|---|
| 3,317,960 A | 5/1967 | Kraemer | |
| 5,193,921 A | 3/1993 | Tsukuda et al. | |
| 5,222,819 A | 6/1993 | Tsukuda et al. | |
| 5,240,335 A | 8/1993 | Itoh et al. | |
| 5,746,518 A | 5/1998 | Ogawa et al. | |
| 5,920,649 A * | 7/1999 | Yasuda et al. | 382/206 |
| 5,982,911 A | 11/1999 | Matsumoto et al. | |
| 6,164,850 A | 12/2000 | Speakman | |
| 6,438,271 B1 * | 8/2002 | Usami et al. | 382/274 |
| 6,542,623 B1 | 4/2003 | Kahn | |
| 6,561,091 B1 | 5/2003 | Steve | |
| 6,819,228 B2 | 11/2004 | Gipson et al. | |
| 7,112,000 B2 | 9/2006 | Kurashina et al. | |
| 7,179,001 B2 | 2/2007 | Akaiwa | |

(Continued)

FOREIGN PATENT DOCUMENTS

| | | |
|---|---|---|
| CN | 2168715 | 6/1994 |
| JP | S5890983 | 5/1983 |

(Continued)

OTHER PUBLICATIONS

Neovision s.r.o, "Optical Braille Recognition System, User Manual", Jan. 2004, pp. 1-34.*

(Continued)

*Primary Examiner* — Neil R McLean
(74) *Attorney, Agent, or Firm* — Andrew M. Calderon; Roberts Mlotkowski Safran Cole & Calderon, P.C.

(57) ABSTRACT

A Braille Copy Machine includes a processor configured to detect at least one Braille cell from a scanned image of an original Braille document. The detecting includes determining a coordinate and a code for the at least one Braille cell. The Braille Copy Machine also includes an embosser configured to create an embossed copy of the original Braille document based on the determined coordinate and code for the at least one Braille cell.

9 Claims, 8 Drawing Sheets

(56) References Cited

U.S. PATENT DOCUMENTS

| | | | |
|---|---|---|---|
| 7,189,766 | B2 | 3/2007 | Takahashi et al. |
| 7,234,882 | B2 | 6/2007 | Takada et al. |
| 7,290,951 | B2 | 11/2007 | Tanaka et al. |
| 7,298,391 | B2 | 11/2007 | Emmert et al. |
| 7,341,456 | B2 | 3/2008 | McAdams et al. |
| 7,419,317 | B2 | 9/2008 | Akaiwa |
| 7,458,739 | B2 | 12/2008 | Akaiwa |
| 7,484,960 | B2 | 2/2009 | Ligon |
| 7,527,443 | B2 | 5/2009 | Akaiwa et al. |
| 7,556,444 | B2 | 7/2009 | Kurashina et al. |
| 2005/0129283 | A1* | 6/2005 | Butler et al. .............. 382/114 |

FOREIGN PATENT DOCUMENTS

| | | |
|---|---|---|
| JP | H07164679 | 6/1995 |
| JP | H07234632 | 9/1995 |
| JP | H08305276 | 11/1996 |
| JP | H09183257 | 7/1997 |
| JP | H1128840 | 2/1999 |
| WO | 02/075247 | 9/2002 |

OTHER PUBLICATIONS

Techno-Vision Systems Ltd., "Optical Braille Recognition", Nov. 12, 2009, "http://www.techno-vision.co.uk/obr.htm", pp. 1-3.
Pier Luigi Emiliani, "Development of electronic aids for the visually impaired", 1986, pp. 57.
T.E. Gomez, "Air-coupled ultrasonic scanner for Braille", Aug. 7, 2002, "http://ieeexplore.ieee.org/xpl/freeabs_all.jsp?arnumber=991691", Abstract only.
Jan Halousek, "Embossed Braille Advancements: Automatic "Reading" by a New Optical Braille Recognition System "OBR" and Objective Dot and Paper Quality Evaluation", Jan. 5, 1999, "http://www.dinf.ne.jp/doc/english/Us_Eu/conf/csun_99/session0249.html", pp. 1-5.
J.P. Dubus, "Image Processing Techniques to Perform an Autonomous System to Translate Relief Braille Black-Ink, Called : LectoBraille", 1988, pp. 1-2.
Jan Mennens, "Optical Recognition of Braille Writing Using Standard Equipment", Dec. 1994, pp. 207-212.
R.T. Ritchings, "Analysis of Scanned Braille Documents", 1995, pp. 413-421.
Paul Blenkhorn, "A System for Converting Braille into Print", Jun. 1995, pp. 215-221.
T.W. Hentzschel, "An optical reading system for embossed Braille characters using a twin shadows approach", 1995, pp. 341-354.
Yoshifumi Oyama, "Character Recognition of Mixed Convex-Concave Braille Points and Legibility of Deteriorated Braille Points", Systems and Computers in Japan, vol. 28, No. 2, 1997, pp. 44-53.
I. Murray, "A Portable Device for Optically Recognizing Braille—Part I: Hardware Development", Nov. 2001, pp. 129-134.
I. Murray, "A Portable Device for Optically Recognizing Braille—Part II: Software Development", Nov. 2001, pp. 141-145.
Lisa Wong, "A Software Algorithm Prototype for Optical Recognition of Embossed Braille", 2004, pp. 1-4.
A. Antonacopoulos, "A Robust Braille Recognition System", 2004, pp. 533-545.
Nestor Falcon, "Image Processing Techniques for Braille Writing Recognition", 2005, pp. 379-385.
M. Namba, "Cellular Neural Network for Associative Memory and Its Application to Braille Image Recognition", Jul. 2006, pp. 2409-2414.
AbdulMalik Al-Salman, "An Arabic Optical Braille Recognition System", Apr. 2007, pp. 81-87.
Mami Tanaka, "A Wearable Braille Sensor System With a Post Processing", Aug. 2007, pp. 430-438.
Amany A. H. Al-Saleh, "Automatic Dot Detection of Optical Braille Images", Jun. 2007, 94 pages.
"http://en.wikipedia.org/wiki/Beta_distribution", Printed on Jul. 14, 2010, pp. 1-7.
Ng, et al., "Regular Feature Extraction for Recognition of Braille", Third International Conference on Computational Intelligence and Multimedia Applicaitons, 1999, 5 pages.

\* cited by examiner

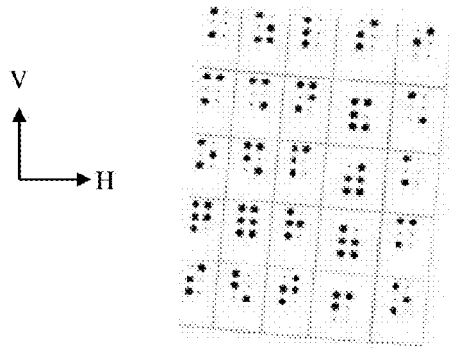
FIG. 11
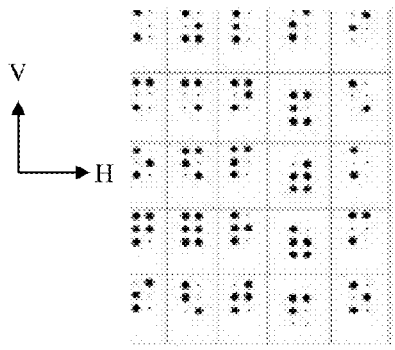
FIG. 12
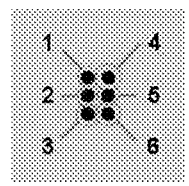
FIG. 13B
FIG. 13A

BRAILLE COPY MACHINE USING IMAGE PROCESSING TECHNIQUES

TECHNICAL FIELD

The invention generally relates to the reproduction of Braille documents, and more particularly, to a Braille Copy Machine (BCM) that uses image processing techniques and an associated method.

BACKGROUND

Braille is a very important communication code for people worldwide with low vision and blindness. For some years, there has been an increasing trend to use computers for entering, editing, and printing new Braille documents using special purpose software and printers. However, there are a large number of old Braille documents starting to wear out which need to be reproduced so that they can be preserved and accessed by more people. Since manual transcription is tedious and costly, there is a need for a system to duplicate Braille documents.

One of the current methods to reproduce Braille documents is to use a piece of thermal-sensitive material and melt the material on the document to be reproduced using, for example, a Braille Thermoform Machine having a heater. It is useful for making a limited number of copies of Braille documents. The way it functions is by placing a Braille document (e.g., paper embossed with Braille markings) on a flat surface on the machine. Then, a blank plastic page is placed on top of the Braille document. Both pages are held in place by a frame, which is lowered over the edges of the platform. After that, a heating unit is pulled over the material and held there for three to five seconds. At the end of this time, a vacuum device sucks the softened plastic page down over the Braille dots, so that the plastic is molded into a pattern identical to the page underneath the plastic. To do another copy, the whole process has to be repeated. While this method produces an accurate replica of the original document, it is very primitive, generates a single copy at a time, produces a bad smell, cannot be used for double-side Braille paper, cannot be used if the current Braille document is plastic, and the quality and resolution of the Braille dots of the original document are degraded as a result of the process.

Accordingly, there exists a need in the art to overcome the deficiencies and limitations described herein above.

SUMMARY

In a first aspect of the invention, there is a Braille Copy Machine including a processor configured to detect at least one Braille cell from a scanned image of an original Braille document. The detecting includes determining a coordinate and a code for the at least one Braille cell. The Braille Copy Machine also includes an embosser configured to create an embossed copy of the original Braille document based on the determined coordinate and code for the at least one Braille cell.

In another aspect of the invention, there is a method for copying an original Braille document. The method includes detecting at least one Braille cell from a scanned image of the original Braille document, wherein the detecting comprises determining a coordinate and a code for the at least one Braille cell. The method also includes creating an embossed copy of the original Braille document based on the determined coordinate and code for the at least one Braille cell.

In an additional aspect of the invention, there is a Braille copying system comprising a scanner configured to scan an image of an original Braille document. The system also includes a processor configured to detect a plurality of Braille cells from the scanned image of the original Braille document, determine a coordinate for each respective one of the plurality of Braille cells, and associate each respective one of the plurality of Braille cells with a code. The system further includes an embosser configured to create an embossed copy of the original Braille document based on the determined coordinate and the associated code of each respective one of the plurality of Braille cells. The scanner, the processor, and the embosser are integrated in a unitary machine. The processor is configured to automatically detect whether the original Braille document is a one-sided document or a two-sided document. The scanning, the detecting, and the creating preserves a layout of the original Braille document in the embossed copy of the original Braille document.

BRIEF DESCRIPTION OF THE SEVERAL VIEWS OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 11 and 12 depict rotational alignment of scanned images in accordance with aspects of the invention;

FIGS. 13A and 13B show a lookup table and associated dot numbering arrangement in accordance with aspects of the invention.

DETAILED DESCRIPTION

The present invention generally relates to the reproduction of Braille documents, and more particularly, to a Braille Copy Machine that uses image processing techniques and an associated method. Exemplary embodiments of the invention comprise a Braille Copy Machine (BCM) that produces a Braille copy of an original Braille document regardless of the language (e.g., Arabic, English, etc.) of the original document. In embodiments, the copy is produced on plain Braille paper and has the same format and layout as the original document. In this manner, implementations of the invention enable visually impaired persons, as well as anyone else, to copy any document written in Braille code instantly and without regard to language or format of the original document According to aspects of the invention, a BCM comprises a flat bed scanner, a processing unit, and a Braille embosser all integrated into a single machine. In embodiments, the BCM uses optical scanning and image processing techniques to produce a physical copy of an original Braille document. For example, the processor performs image processing techniques such as: converting the scanned image to grayscale; cropping; rotating; classifying pixels as light portions of Braille dots, dark portions of dots, or background; detecting Braille dots; detecting Braille cells; associating the detected cells with a code without converting and/or translating the cells to or from a language (e.g., Arabic, English, etc.); and determining coordinates of the detected cells. In particular embodiments, the processor determines a code and a coordinate for each individual detected Braille cell. By determining coordinates for each cell, an embossed copy of the original Braille document may be created having the exact format (e.g., layout, margins, indents, line spacing, etc.) as the original Braille document. Moreover, by associating each cell with a code, the embossed copy of the original Braille document may be created without converting and/or translating the cells to or from a language.

Figure 1:
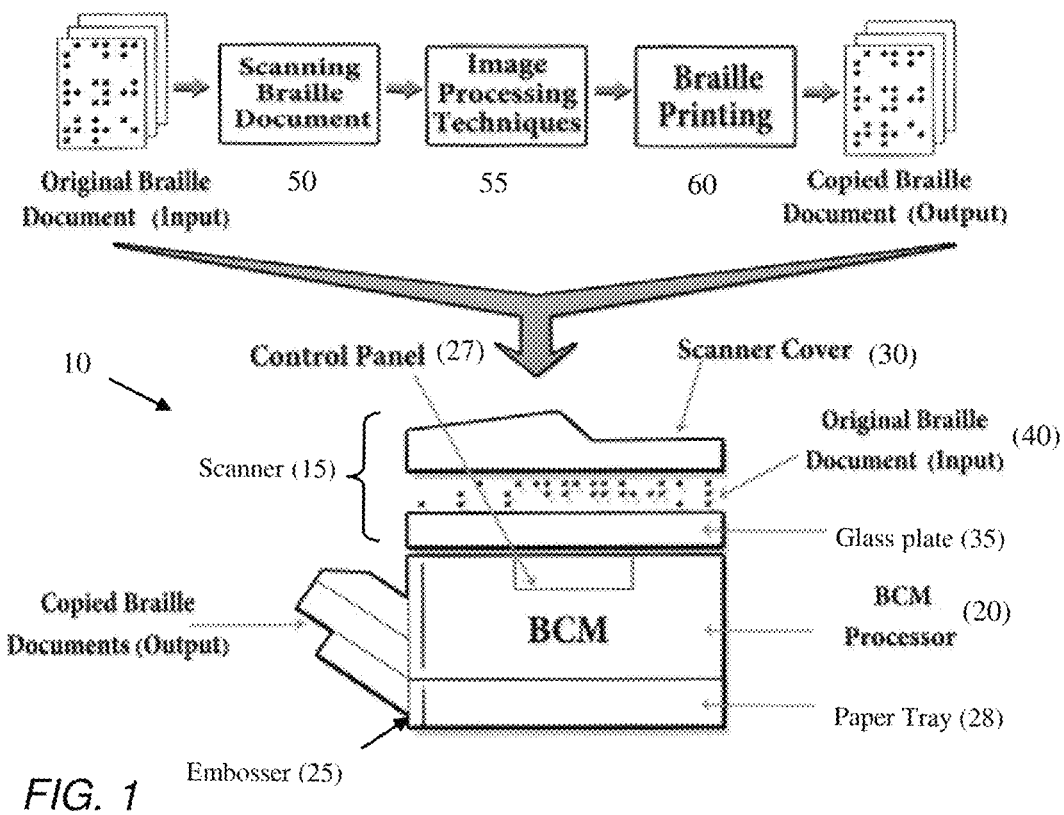
FIG. 1 shows an exemplary Braille Copy Machine and associated process flow in accordance with aspects of the invention.

FIG. 1 shows an exemplary BCM 10 in accordance with aspects of the invention. In embodiments, the BCM 10 includes a scanner 15, a processor 20, and a Braille embosser 25. The BCM 10 may also include a control panel 27 and a paper tray 28. The scanner 15 may comprise a conventional flatbed scanner including a scanner cover 30, a glass plate 35, an illumination source, and an image sensor (e.g., CCD). In implementations, the glass plate 35 comprises yellow colored glass which provides a beneficial contrast between regions of Braille dots and the background of the Braille paper when scanning an original document 40 embossed on white paper. Alternatively to using a glass plate 35 comprising yellow glass, a clear glass plate 35 may be used and a yellow plastic may be placed on the glass plate 35. Moreover, although yellow is described, the glass plate 35 may be any suitable color, or covered with a film of any suitable color, that provides sufficient conditions for optically detecting the Braille dots.

According to further aspects of the invention, the processor 20 comprises at least one computer-based processor, e.g., microprocessor, or related integrated circuit device that is configured to perform the image processing functions described herein. For example, the processor 20 may include a circuit board having a microprocessor, memory, and interface(s) for communicating with the scanner 15, embosser 25, and control panel 27.

In embodiments, the embosser 25 comprises an embossing machine that receives a signal from the processor 20, receives or retrieves a piece of Braille paper from the paper tray 28, and mechanically embosses one or more Braille cells on the paper. In particular embodiments, the embosser 25 receives from the processor 20 an x-y coordinate and a code for each Braille cell to be printed. Alternatively, in embodiments, the coordinate of the first cell in a line is used as the basis for printing all of the cells in that line. Even further, the BCM may be configured to determine the coordinates (e.g., x-y coordinates) of each detected dot, rather than the coordinates of each detected cell and/or the first cell of each line. In this implementation, the coordinates of each dot are communicated to the embosser, and the embosser prints a new Braille document based on the coordinates of each dot.

In embodiments, the paper tray 28 is structured and arranged to hold a plurality of plain Braille papers and feed the papers to the embosser 25. Any size Braille paper may be used within the scope of the invention. Furthermore, the processor 20 may be configured to automatically determine the document size of the original Braille document placed on the scanner 15 and compare the detected paper size to that of the paper in the paper tray 28. The size may be detected, for example, using optical techniques to detect the edges of the paper placed on the scanner. The processor 20 may be configured to alert the user, e.g., via audible alarm, when the original document size is larger than the paper available in the paper tray 28.

Still referring to FIG. 1, an exemplary copying process sequence is depicted as a block diagram at elements 50, 55, and 60. At step 50, an original Braille document 40 is scanned using the scanner 15. The scanned image is communicated from the scanner 15 to the processor 20. At step 55, the processor 20 performs image processing techniques on the scanned image to detect Braille dots and cells to produce a new image in a format that can be used by the embosser 25. The new image is communicated to the embosser 25 in the form of cell coordinates and ASCII codes for each respective Braille cell to be printed. At step 60, the embosser 25 prints (e.g., embosses) a Braille copy of the original document 40.

Figure 2:
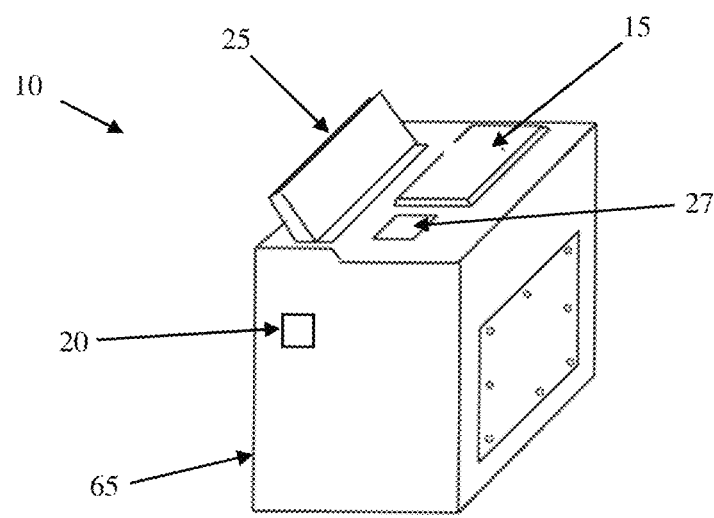
FIGS. 2 and 3 also depict exemplary Braille Copy Machines according to aspects of the invention.
Figure 3:
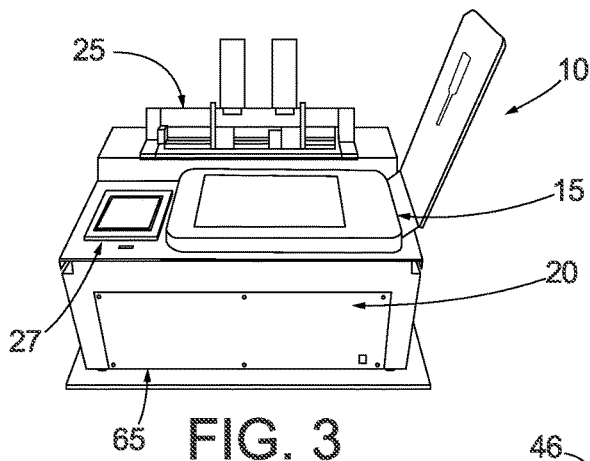

FIGS. 2 and 3 show exemplary implementations of the BCM 10 in accordance with aspects of the invention. As depicted in FIGS. 2 and 3, the scanner 15, processor 20, embosser 25, and control panel 27 may be integrated in a single housing 65 such that all of the elements of the BCM are integrated in a unitary machine.

Alternatively, the processor 20 may be a stand-alone computer device that is interfaced with the scanner 15, embosser 25, and control panel 27. Moreover, the present invention may take the form of a hardware embodiment, a software embodiment or a combination of software and hardware. For example, implementations of the invention may include a server or other computing system that can perform the processes described herein. The server may include a computing device which can be resident on a network infrastructure or computing device. The computing device may include the processor 20, memory, an I/O interface, and a bus. In addition, the computing device may include random access memory (RAM), a read-only memory (ROM), and an operating system (O/S).

The computing device may be in communication with the external I/O device/resource and the storage system. The I/O device can comprise any device that enables an individual to interact with the computing device (e.g., user interface) or any device that enables the computing device to communicate with one or more other computing devices using any type of communications link.

The processor 20 executes computer program code (e.g., an application, program control, etc.), which can be stored in the memory and/or storage system. While executing the computer program code, the processor 20 can read and/or write data to/from memory, storage system, and/or I/O interface. The program code executes the processes of the invention such as, for example: converting the scanned image to grayscale; cropping the scanned image; rotating the scanned image; classifying pixels of the scanned image as light portions of Braille dots, dark portions of dots, or background; detecting Braille dots; detecting Braille cells;

associating the detected cells with an code without converting and/or translating the cells to or from a language (e.g., Arabic, English, etc.); and determining coordinates of the detected cells.

In embodiments, one or more surfaces of the housing 65 may be provided with raised Braille cells providing instructions on where to place the original Braille document 40 on the scanner 15. Additionally or alternatively, the BCM may include a system for providing audible instructions to the user, such as a speaker that plays speech-based instructions. The instruction may provide, but is not limited to, an indication of a particular corner of the scanner on which to place the original Braille document 40.

Figure 4:
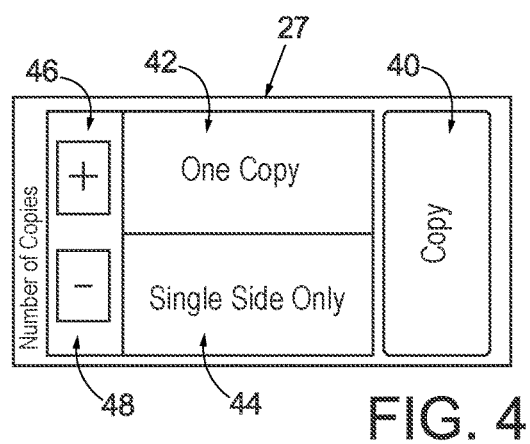
FIG. 4 shows a control panel in accordance with aspects of the invention.

FIG. 4 shows a depiction of the control panel 27 in accordance with aspects of the invention. In embodiments, the control panel 27 may comprise a touch screen panel that displays functions to a user and accepts inputs via a touch of a user. The control panel 27 may additionally or alternatively comprise one or more buttons that have raised Braille cells thereon which describes a function associated with the respective button. Whether set forth on a touch screen panel and/or buttons with raised Braille cells, the user-selectable functions may include: copy 40, number of copies 42, single sided only 44, increment the number of copies 46, and decrement the number of copies 48. The invention is not limited to these functions, and other functions may be used within the scope of the invention. Signals from the control panel 27 are received by the processor 20 and affect how the processor 20 controls the embosser 25 to create a Braille copy. Additionally, the BCM may communicate the number of copies to the user with an audible message.

Figure 5:
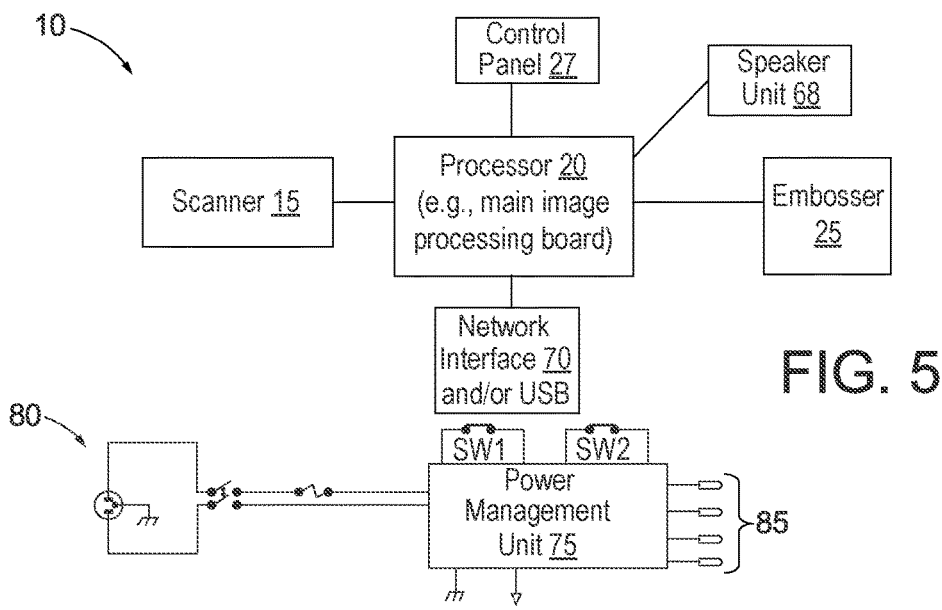
FIG. 5 shows a block diagram of a Braille Copy Machine in accordance with aspects of the invention.

FIG. 5 shows a block diagram of the BCM 10 in accordance with aspects of the invention. As depicted in FIG. 5, the processor 20 is operatively connected to the scanner 15, embosser 25, and control panel 27, as described herein. The processor 20 may be connected to a speaker unit 68 for providing audible alerts and/or messages, as described above. In embodiments, the processor 20 may also be connected to the network interface 70 and/or universal serial bus (USB) that permits the BCM to send and/or receive copy or print commands to/from another unit. The network interface 70 may be integrated into the BCM 10 or may be a separate element. The network interface 70 and/or USB permit the BCM to function as a two-in-one machine. Particularly, the BCM may function as a copier and embosser in a first mode, and can function as an embosser (i.e., printer) that receives a print command from a computer via the network interface 70 and/or USB is a second mode. In additional embodiments, the BCM 10 includes a power management unit 75 that connects to a power supply 80 and provides, amongst other things, AC to DC switching for providing outputs 85 for powering the components of the BCM.

Figure 6:
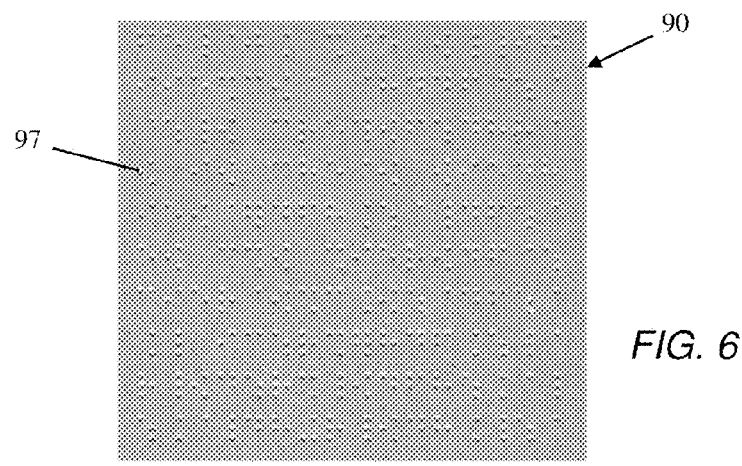
FIGS. 6 and 7 show scanned images of Braille documents.
Figure 7:
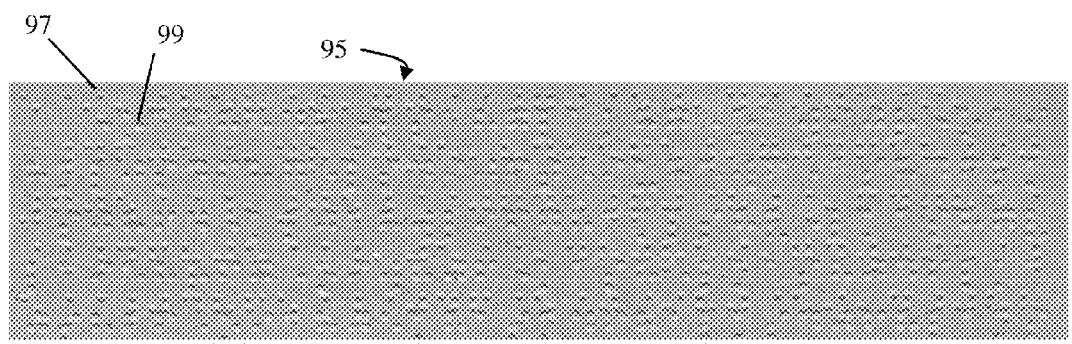
Figure 8:
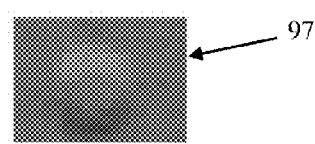
FIGS. 8 and 9 show types of Braille dots.
Figure 9:
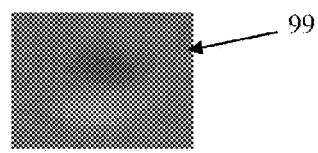

FIG. 6 shows an original scanned image 90 of a single sided Braille document prior to any image processing, and FIG. 7 shows an original scanned image 95 of a double sided Braille document prior to any image processing. In a single sided Braille image, the dots are referred to as recto dots 97 and point in the upward direction. In a double sided Braille image, there are two types of dots: recto dots 97 in the upward direction and verso dots 99 in the downward direction. An example of a recto dot 97 in shown in FIG. 8, and an example of a verso dot 99 is shown in FIG. 9. As discussed in greater detail below with respect to image processing and particularly image segmentation, a recto dot 97 may be identified by a light region that exists above a dark region (FIG. 8), while a verso dot 99 may be identified by a light region that exists below a dark region (FIG. 9).

Figure 10:
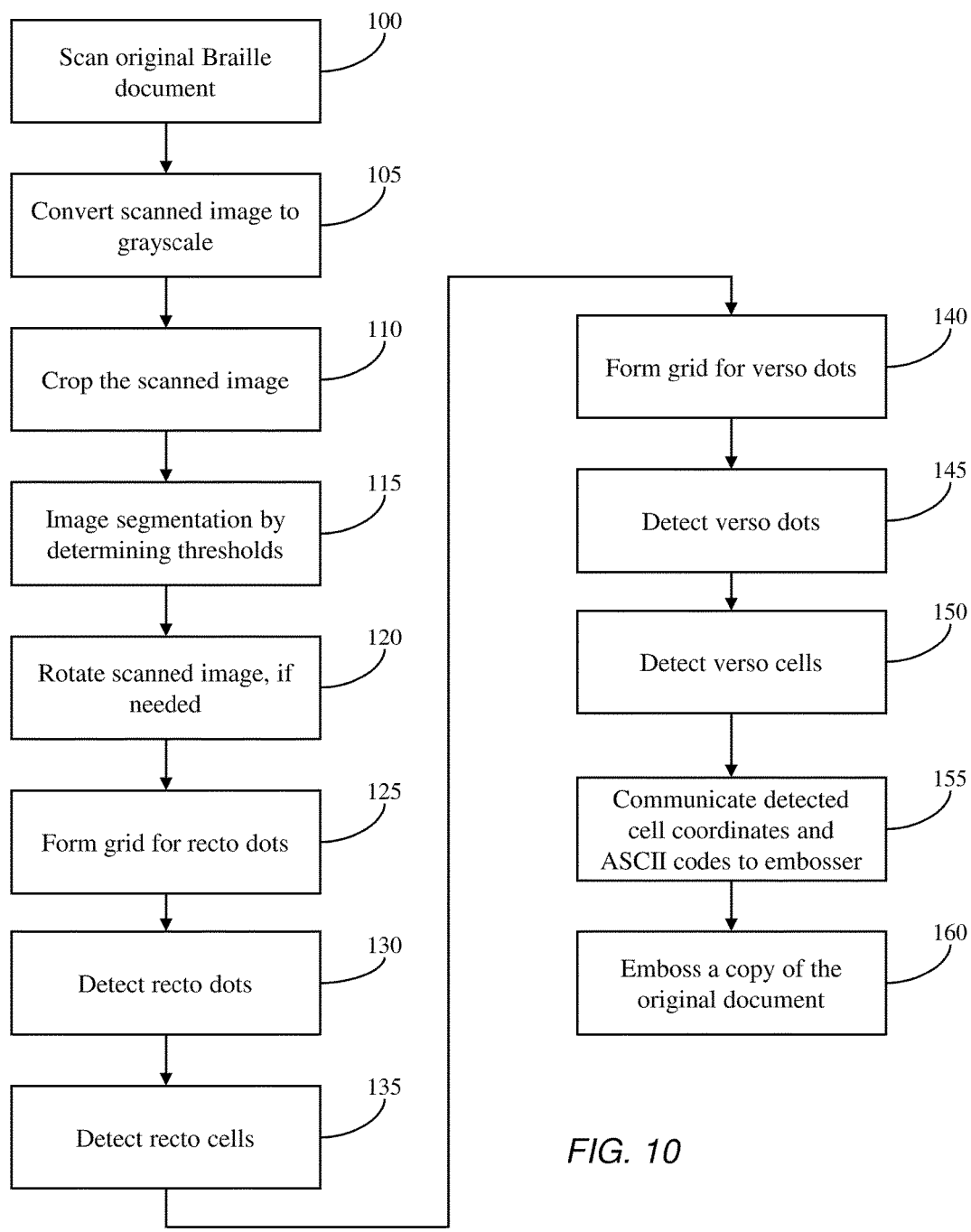
FIG. 10 shows a process flow in accordance with aspects of the invention.

FIG. 10 shows a flow diagram implementing aspects of the present invention. The flow diagram may equally represent a high-level block diagram or a swim-lane diagram of the invention. The steps of the flow diagram may be implemented and executed from a processor comprised in a BCM, a server, in a client server relationship, or they may run on a user workstation with operative information conveyed to the user workstation.

Furthermore, the invention can take the form of a computer program product accessible from a computer-usable or computer-readable medium providing program code for use by or in connection with a computer or any instruction execution system. For example, the invention may take the form of a computer program product embodied in any tangible storage or propagation medium of expression having computer-usable program code embodied in the medium. The computer-usable or computer-readable medium may be any medium that can contain, store, communicate, propagate, or transport the program for use by or in connection with the instruction execution system, apparatus, or device. The computer-usable or computer-readable medium may be, for example, an electronic, magnetic, optical, electromagnetic, infrared, or semiconductor system, apparatus, device, or propagation medium. In embodiments, the computer program product includes a computer usable storage medium having readable program code embodied in the storage medium, the program code causing a computing device to perform one or more of the steps and/or functions described herein when the program code is executed on the computing device. In embodiments, the computer usable storage medium is a tangible storage medium such as, for example, one or more of: a semiconductor or solid state memory, magnetic tape, a removable computer diskette, a random access memory (RAM), a read-only memory (ROM), a rigid magnetic disk, and an optical disk. Examples of optical disks include, but are not limited to, compact disk-read only memory (CD-ROM), compact disk-read/write (CD-R/W), and DVD.

At step 100, an image of an original Braille document is scanned. In embodiments, this involves a user or automatic feed system placing the original Braille document in the scanner (e.g., scanner 15) at which point the scanner optically scans the original Braille document. In embodiments, the scanning may be performed at a resolution of about 150 dpi, although other resolutions may be used. In further embodiments, the illumination of the Braille document is non-uniform, i.e., there is one light source in the scanner arranged at a slight distance from the image sensor (CCD). Although a flat bed scanner is described, the invention is not limited to this type of scanner and any suitable optical scanning device, such as a digital camera, may be used within the scope of the invention.

After the original document is scanned, the scanned image is communicated to the processor (e.g., processor 20) which performs various image processing techniques on the scanned image. The image processing techniques may include, but are not limited to: converting the scanned image to grayscale, cropping the scanned image, image segmentation based on a calculated threshold of the scanned image, rotating the image, forming one or more grids for dot and cell detection, and detecting cells.

For example, at step 105, the processor converts the scanned image (from step 100) to grayscale. At step 110, the processor crops the scanned image. The cropping is used to eliminate black or white borders, e.g., frames, which would affect subsequent image processing techniques. In embodiments, the processor calculates an average gray level for the entire image, an average gray level for each row, and an average gray level for each column. The processor crops the scanned image by deleting any row or column having an average gray level that is 15% above or below the average gray level of the entire image.

At step 115, the processor performs image segmentation of the scanned image. The particular technique of image segmentation described herein is but one way of performing image segmentation of a scanned image of a Braille document. Accordingly, the invention is not intended to be limited to this particular method of image segmentation described herein, but rather any suitable technique of image segmentation may be used within the scope of the invention. In embodiments, the image segmentation is performed to classify the pixels of the scanned image as one of the three modes, e.g., the dark region of a dot, the light region of a dot, or background. More specifically, in embodiments, the three modes of a histogram of a Braille image represent three classes of pixels: (i) Mode 1: represents the dark region of a recto and verso dot; (ii) Mode 2: represents the background; and (iii) Mode 3: represents the light region of a recto and verso dot (e.g., FIGS. 8 and 9). Image segmentation involves the estimation of thresholds T1 and T2 for separating the three modes. In embodiments, the processor is configured such that a histogram of a Braille image is a combination of three Beta distributions. The Beta distribution is a continuous probability distribution with the probability density function (pdf) defined on the interval [0, 1] by Equation 1:

$$f(x \cdot \alpha \cdot \beta) = \frac{\Gamma(\alpha + \beta)}{\Gamma(\alpha)\ \Gamma(\beta)} x^{\alpha-1}(1-x)^{\beta-1} \quad (1)$$

where $\alpha$ and $\beta$ are the shape parameters of the distribution and must be greater than zero, x is a random variable, and it must be between 0 and 1. The Beta distribution can take different shapes depending on the values of its two parameters $\alpha$ and $\beta$. The histogram h(x) of a Braille image can be written as follows in Equation 2:

$$h(x) = p_1 f(x, \alpha_1, \beta_1) + p_2 f(x, \alpha_2, \beta_2) + p_3 f(x, \alpha_3, \beta_3) \quad (2)$$

The estimated threshold Tnew of a Braille image can be calculated using Equation 3:

$$T_i^{new} = 1 - e^{\frac{-A - B\log(T_i^0)}{C}} \quad (3)$$

where:

$A = \log((p_i K_i)/(p_{i+1} K_{i+1})), B = \alpha_i - \alpha_{i+1},$ $C = \beta_i - \beta_{i+1}$ and $K_r = \Gamma(\alpha_r - \beta_r)/\Gamma(\alpha_{r+1} - \beta_{r+1}), r = i, i+1$ The statistical parameters of the histogram $(p_i, \alpha_i, \beta_i)$, i=1, 2, 3 are estimated using the stability of thresholding algorithm. In embodiments, recognition software associated with the processor applies stability thresholding using the Beta distribution in order to initiate the process of a multi-mode estimator that calculates threshold values. Segmentation is then performed on those values.

Thresholding as described above is used for the separation (e.g., classifying) of pixels of the scanned image. In embodiments, the pixels of the scanned image are classified as one of the three above-mentioned modes, e.g., the dark region of a dot, the light region of a dot, or background. The thresholding permits the processor to detect and identify recto dots and verso dots in the scanned image in subsequent image processing steps. In embodiments, the threshold of the entire scanned image is calculated once, without performing additional threshold calculations such as once for recto dots and a second time for verso dots. The threshold is not fixed for all scanned images, and the operation of performing a single threshold determination for an entire scanned image is referred to as adaptive thresholding.

At step 120, the scanned image is automatically rotated, if necessary, to substantially align the scanned image with the vertical and horizontal directions. The cells in an original Braille document are typically arranged in the horizontal and vertical directions. Often times, however, the rows and columns of the original scanned image are not aligned in the vertical and horizontal directions. Such misalignment is depicted in FIG. 11 in which the rows and columns of dots are not aligned with the horizontal direction "H" and the vertical direction "V". This misalignment may be due to a number of factors, such as the original Braille document being placed askew in the scanner, a component of the scanner being out of alignment, etc. Any such misalignment makes subsequent image processing more burdensome. Accordingly, in embodiments of the invention, the scanned image is automatically rotated so that the dots are aligned with the vertical direction "V" and the horizontal direction "H", as depicted in FIG. 12. The particular technique of image rotation described herein is but one way of performing image rotation of a scanned image of a Braille document. Accordingly, the invention is not intended to be limited to this particular method of image rotation described herein, but rather any suitable technique of image rotation may be used within the scope of the invention.

In accordance with aspects of the invention, rotation of the scanned Braille image is performed by the processor using a binary search algorithm to arrange Braille cells containing dots in horizontal and vertical directions. In embodiments, the degree of recognizing a rotated image is four degrees from either the left or the right side, however any degree may be used with implementations of the invention. To calculate the rotating degree for aligning a misaligned scanned image, either the dark or the bright mode of pixels from the segmentation of step 115 is selected for analysis and the other mode (e.g., bright or dark, respectively) is temporarily ignored. Using the selected part of the scanned image, e.g., the dark mode or the bright mode, the number of rows having more than a predetermined number of dots is determined by counting the number of pixels in each row using horizontal projection. In embodiments, the predetermined number of dots is ten, however any number may be used for the predetermined number of dots. The image is rotated four degrees from center to the left and the number of rows having more than the predetermined number of dots is again determined. The image is then rotated four degrees from center to the right and the number of rows having more than the predetermined number of dots is again determined. Thus, the number of rows having greater than the predetermined number of dots is determined at a middle position (no rotation), a left-rotated position (left position), and a right-rotated position (right position).

After determining the number of rows having greater than the predetermined number of dots in the middle position, left position, and right position, the processor compares the numbers of rows of the left position to the number of rows of the right position. When the number rows having greater than the predetermined number of dots in the left position equals the number of rows having greater than the predetermined number of dots in the right position, then the scanned image is already substantially aligned with the vertical and horizontal directions and the scanned image is not rotated prior to further processing. On the other hand, when the number rows having greater than the predetermined number of dots in the left position does not equal the number of rows having greater than the predetermined number of dots in the right position, then the scanned image will be rotated by an amount prior to further image processing. The degree of rotation is determined as described herein.

There are two possible conditions when the number rows having greater than the predetermined number of dots in the right position does not equal the number of rows having greater than the predetermined number of dots in the left position. The first condition is that the number of rows in the right position is less than that for the left position. The second condition is that the number of rows in the left position is less than that for the right position. When the first condition is true, the processor sets the previously calculated middle position as the new starting point for the left side, and then the processor calculates the number of rows for this new middle point for both the right and left sides. On the other hand, when the second condition is true, the processor sets the previously calculated middle position as the new starting point for the right side, and then the processor calculates the number of rows for this new middle point for both the right and left sides.

After setting the new middle point and determining the number of rows that meet the criteria for both the left and right sides, the comparison step between the number of rows on the left side and the number of rows on the right side is repeated. The comparison step and setting of a new middle point are repeated as long as half the difference between the right and left deviation is more than a predetermined ratio. In embodiments, the predetermined ratio is 1/16, however any small value may be used in implementations of the invention. When the comparison step and setting of a new middle point converge on a solution where half the difference between the right and left deviation is less than the predetermined ratio, the scanned image is rotated by this deviation degree. The steps may be repeated on the rotated images to verify its alignment with the vertical and horizontal directions.

Referring back to FIG. 10, at step 125, the processor forms a grid on the scanned image isolating each recto dot in a box of the grid. In embodiments, the grid is constructed according to the known Braille features that the distance between a dot and another dot in the same cell is fixed and the distance between a cell and another cell is fixed. Particularly, the grid is formed by first selecting a starting dot and then generating horizontal lines with regular intervals and vertical lines. Horizontal lines are used as the base since Braille cells in the scanned image have a regular horizontal arrangement but may possibly have an irregular vertical arrangement.

At step 130, recto dots within the grid are detected. In embodiments, this is performed by the processor analyzing the light pattern of the image within each box of the grid, using the thresholding values determined at step 115, and searching for a pattern that matches that of a recto dot as shown in FIG. 8. When the processor finds a recto dot in the scanned image, the processor draws a recto dot in a new output image at the same location as the found recto dot in the scanned image. The location of each dot is known from the x and y coordinates of the grid that was formed in step 125. The end result of step 130 is a new output image in the form of an object file that contains the coordinates of the top-left corner of each found recto dot.

At step 135, recto cells are detected from the detected recto dots. Having identified all possible recto dots, the processor defines a region containing all of the recto dots so that no recto dots exist outside this region. In Braille, there are 64 possible permutations of recto dots within a cell, there are standard distances between dots within cells, and there are standard distances between cells. Based on these permutations and standards, it is straightforward to recognize Braille cells amongst the detected recto dots. Particularly, the grid in step 125 may be formed using standard distances as the base of the grid and/or based on detected dots. In embodiments, the processor is programmed or provided with logic to perform the recto dot detection and recto cell detection.

At step 140, the processor forms a grid for the verso dots. At step 145, the processor detects the verso dots within the grid and creates another new output image in the form of an object file that contains the coordinates of the top-left corner of each found verso dot. At step 150, the processor detects the verso dot cells corresponding to the detected verso dots. Steps 140, 145, and 150 may be performed in a manner similar to steps 125, 130, and 135, but with regard to verso dots rather than recto dots.

In accordance with aspects of the invention, the information from steps 135 and 150 is stored and used at the printing stage. The information may be stored in any suitable manner. In embodiments, arrays are used for storing the detected Braille cells and their respective coordinates. For example, for each side of the original Braille document, a one-dimensional array is used to store all of the detected Braille cells of a side of the document. Each element of the array points to another array that has six elements representing the six dots in the cell.

At step 155, the processor communicates cell coordinates and an ASCII code for each cell to the embosser (e.g., Braille printer, embosser 25). At step 160, the embosser creates (e.g., embosses) a new Braille document is based on the information from steps 155. In embodiments, the embosser is configured to receive ASCII code for each Braille cell and to emboss a Braille paper with dots based on the received code. The embosser may be controlled through a programming interface using standard Windows APIs. The printing command receives the ASCII code for each Braille cell in the document along with its coordinates and Braille font. Alternatively, rather than using coordinates for each individual cell, the coordinate of the first cell in a line of cells may be used as the basis for printing all of the cells in that line. Alternatively, rather than using coordinates of cells, the BCM may be configured to determine the coordinates (e.g., x-y coordinates) of each detected dot and send these dot coordinates to the embosser. In case of double sided documents, the processor sends two pages to the embosser and the embosser embosses the two pages on respective sides of a single paper.

In accordance with aspects of the invention, a lookup table 200 depicted in FIG. 13A defines a relationship between each one of the 64 permutations of dots and a code (e.g., ASCII code). In embodiments, the table 200 may comprises 64 rows, where each row intersects: a first column 202 defining a numerical combination of Braille dots; a second column 204 defining a table index ranging from 0 to 63; a third column 206 defining an ASCII code corresponding to the particular Braille cell; and a fourth column 208 defining the dots in the corresponding Braille cell. FIG. 13B shows an exemplary association of numbers to dots that may be used to create the numerical combinations used in the first column 202 of the lookup table 200. In embodiments, the processor directly associates each detected Braille cell with a respective code via the lookup table, which means that the detected Braille cells are not converted to textual letters of any particular language (e.g., Arabic, English, etc.) prior to embossing. Instead, detected Braille cells are converted to code without text translation, and this code for each cell along with the coordinates of each cell are sent to the embosser for embossing. In this manner, implementations of the invention eliminate the step of translating from Braille to or from a specific language (e.g., Arabic, English, etc.) as is done in optical Braille recognition (OBR) systems.

Alternatively, the BCM may be configured to determine the coordinates (e.g., x-y coordinates) of each detected dot, rather than the coordinates of each detected cell. In this implementation, the coordinates of each dot are communicated to the embosser, and the embosser prints a new Braille document based on the coordinates of each dot.

Moreover, because the embosser is provided with the coordinates of each Braille cell, the exact format and layout (e.g., margins, indents, tabs, line spacing, etc.) of the original document are preserved and replicated in the embossed document. OBR systems do not maintain the original document format and layout. This is because OBR involves an extra step of translating from Braille to a specific textual language, and further because translating Braille cells to text is not one-to-one translation since, in many cases, plural Braille cells correspond to one text symbol (e.g., one letter). In contrast, in embodiments of the invention, each individual detected Braille cell is associated with a code, this code is sent to the embosser, and the embosser reproduces the detected cell by embossing a dot pattern associated with the code. Thus, implementations of the invention provide an improvement over OBR-based systems.

In further embodiments, the embosser (e.g., Braille printer, embosser 25) is controlled through an interface of the BCM. For example, the processor allocates the ASCII code for each detected cell using the lookup table for all of the detected cells in each line of the Braille document. The processor draws the processed cells in line with their coordinates (x, y) in the page which is going to be printed at the end. The processor repeats the steps for each line of the Braille document, line by line, and then sends the page to the printer.

Figure 14:
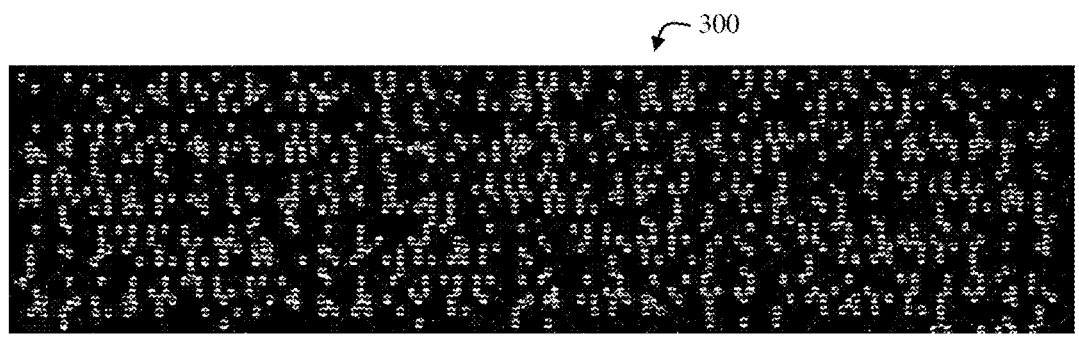
FIGS. 14-23 depict image processing techniques performed in accordance with aspects of the invention.
Figure 15:
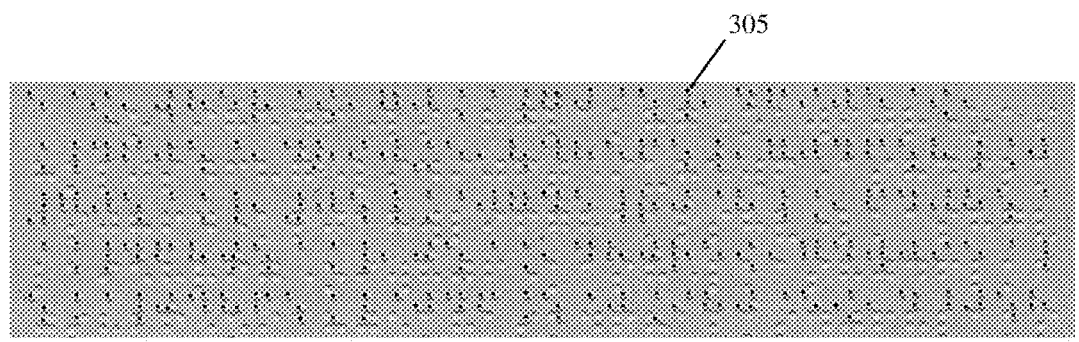
Figure 16:
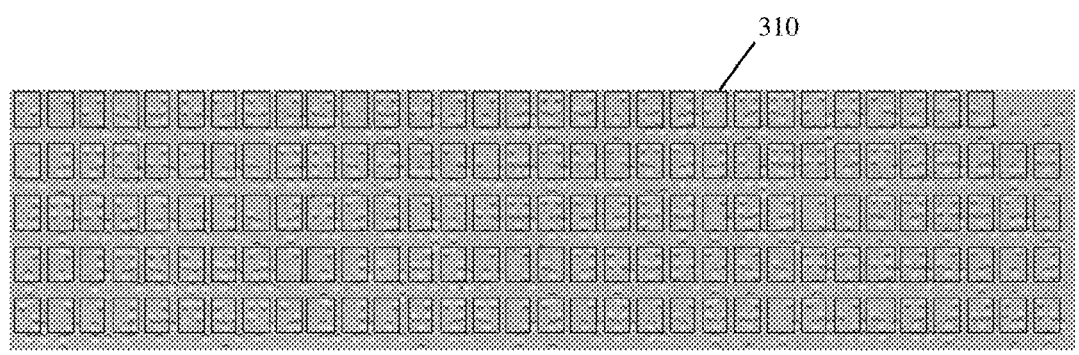

FIGS. 14-23 depict examples of segmented images, dot detection, cell detection, and copied images. More specifically, FIG. 14 shows a double-sided segmented image 300 corresponding to the original double sided Braille document shown in FIG. 7. In the segmented image in FIG. 14, there are three classes of pixels, as described with respect to step 115. FIG. 15 shows a representation of detected recto dots 305 from the double-sided Braille image, such as described with respect to step 130. FIG. 16 shows a representation of detected recto cells 310 from the double-sided Braille image, such as described with respect to step 135. As can be seen in FIG. 16, all of the recto dots are contained within a respective recto cell 310, while verso dots are ignored at this stage.

Figure 17:
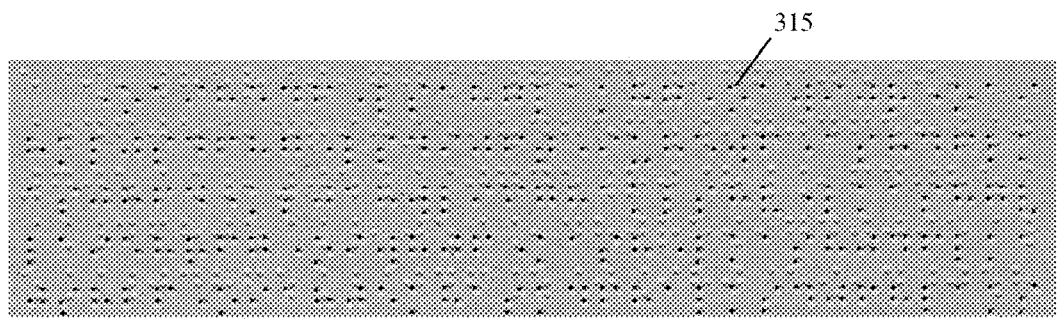
Figure 18:
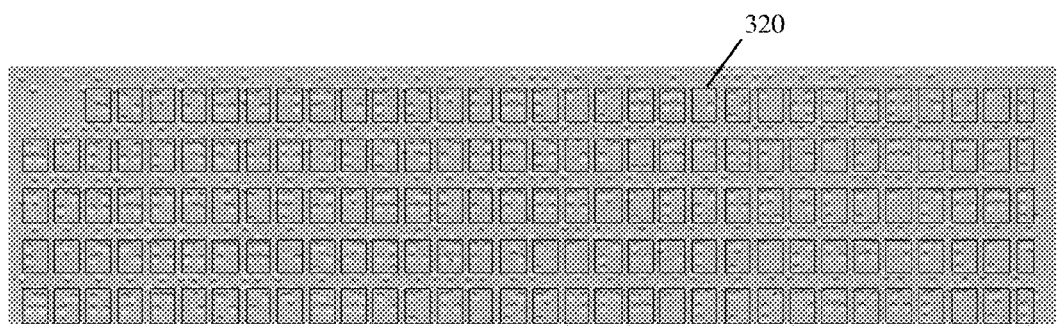
Figure 19:
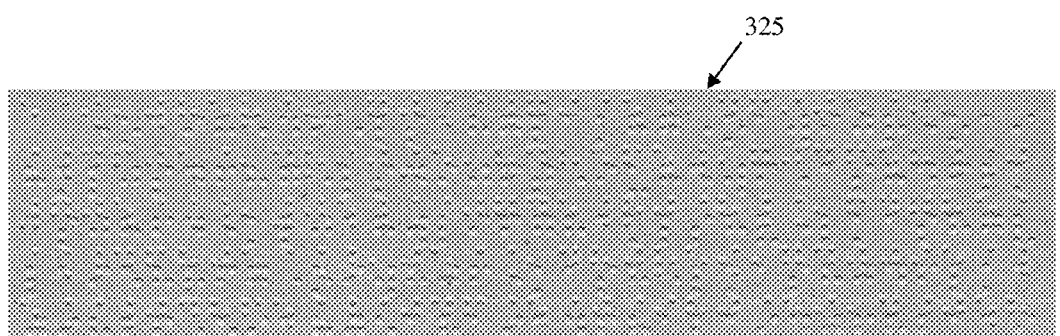

FIG. 17 shows a representation of detected verso dots 315 from the double-sided Braille image, such as described with respect to step 145. FIG. 18 shows a representation of detected verso cells 320 from the double-sided Braille image, such as described with respect to step 150. As can be seen in FIG. 18, all of the verso dots are contained within a respective verso cell 320, while recto dots are ignored at this stage. FIG. 19 shows an image 325 of the copied double-sided Braille document produced in accordance with aspects of the invention.

Figure 20:
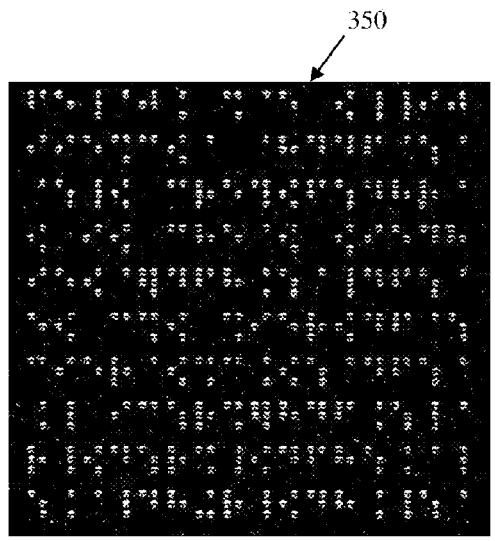
Figure 21:
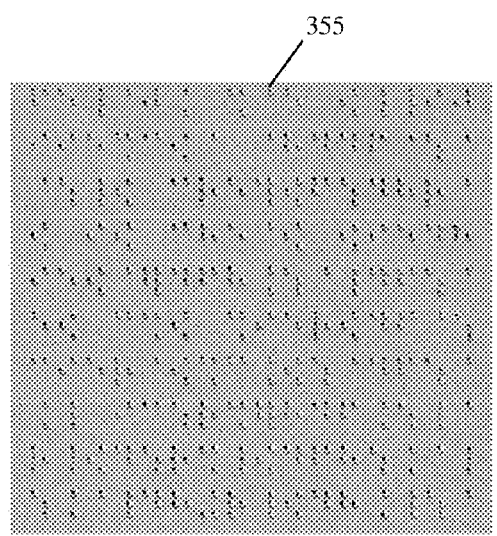
Figure 22:
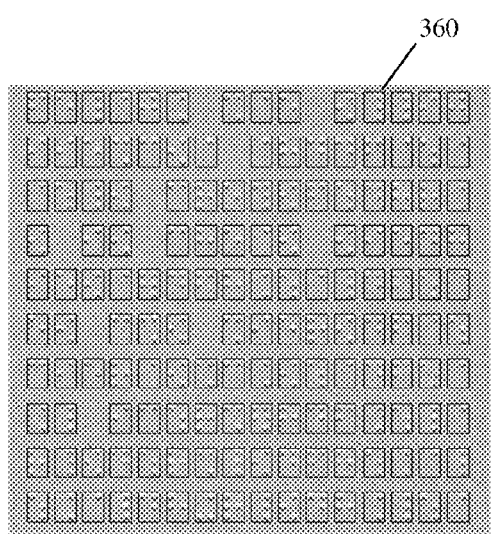
Figure 23:
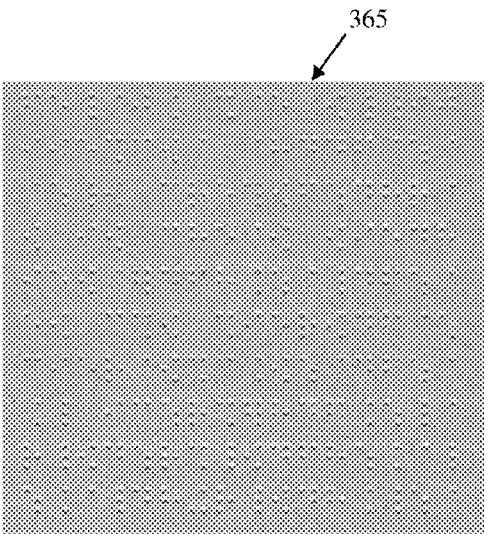

FIG. 20 shows a representation of a single-sided segmented image 350 corresponding to the original single sided Braille document shown in FIG. 6. In the segmented image in FIG. 20, there are three classes of pixels, as described with respect to step 115. FIG. 21 shows a representation of detected dots 355 (e.g., recto dots) from the single-sided Braille image. FIG. 22 shows a representation of detected cells 360 (e.g., recto cells) from the single-sided Braille image. As can be seen in FIG. 22, for a single sided image, all of the dots are contained within a cell 360. FIG. 23 shows an image 365 of the copied single-sided Braille document produced in accordance with aspects of the invention.

Although particular aspects of the invention have been described herein, it is noted that other features may be used within the scope of the invention. For example, the BCM may be configured to automatically detect whether an original document is a single sided or a double sided document based on the existence of only recto dots or both recto dots and verso dots, and automatically emboss the produced copy as single sided or double sided to match the original. This automatic detection may be based on analyzing the scanned image for the presence of both recto and verso dots. A single sided original will have only recto dots, while a double sided original will have both recto dots and verso dots. Alternatively, as user may use the control panel to select single sided copying from a double sided document.

Moreover, a sheet feeder may be used to feed plural original Braille sheets to the BCM. For example, a sheet feeder may be fitted to the scanner with an air blower that separates a top one of the Braille documents from remained of the documents in the sheet feeder.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A Braille copy machine, comprising:
a processor configured to detect at least one Braille cell from a scanned image of an original Braille document, wherein the detecting comprises determining a coordinate and a code for the at least one Braille cell; and
an embosser configured to create an embossed copy of the original Braille document based on the determined coordinate and code for the at least one Braille cell,
wherein the processor automatically rotates the scanned image of the original Braille document, wherein the rotating comprises:
determining, from the scanned image, a first number of rows having more than a predetermined number of dots;
rotating the scanned image a predefined amount to the left to a second image position, and determining for the second image position a second number of rows having more than the predetermined number of dots;
rotating the scanned image a predefined amount to the right to a third image position, and determining for the third image position a third number of rows having more than the predetermined number of dots; and
comparing the second number of rows to the third number of rows.

2. The machine of claim 1, wherein the automatic rotation substantially aligns the rows and columns of the scanned image of the original Braille document with a horizontal direction and a vertical direction, respectively.

3. A Braille copy machine, comprising:
a processor configured to detect at least one Braille cell from a scanned image of an original Braille document, wherein the detecting comprises determining a coordinate and a code for the at least one Braille cell; and
an embosser configured to create an embossed copy of the original Braille document based on the determined coordinate and code for the at least one Braille cell,
wherein the processor classifies the pixels of the scanned image of the original Braille document into three modes, and
the classifying is based on determined threshold values, wherein the threshold values are determined by applying stability thresholding using a Beta distribution.

4. A method for copying an original Braille document, comprising:
detecting at least one Braille cell from a scanned image of the original Braille document, wherein the detecting comprises determining a coordinate and a code for the at least one Braille cell; and
creating an embossed copy of the original Braille document based on the determined coordinate and code for the at least one Braille cell,
wherein the detecting comprises segmenting the pixels of the scanned image of the original Braille document into three modes based on determined thresholds, wherein the thresholds are determined by applying stability thresholding using a Beta distribution.

5. The method of claim 4, wherein the three modes comprise:
a first mode corresponding to a dark region of a Braille dot;
a second mode corresponding to a light region of a Braille dot; and
a third mode corresponding to a background.

6. The method of claim 4, wherein detecting further comprises:
forming a grid on the scanned image that isolates each dot in a box of the grid;
detecting recto dots based on the three modes by analyzing a light pattern of the scanned image within each box of the grid;
detecting recto cells based on the detected recto dots;
detecting verso dots based on the three modes; and
detecting verso cells based on the detected verso dots.

7. The method of claim 4, wherein:
the code for the at least one Braille cell is ASCII and is determined without converting the at least one Braille cell into a language; and
the scanning, the detecting, and the creating preserves a layout of the original Braille document in the embossed copy of the original Braille document.

8. A Braille copying system, comprising:
a scanner configured to scan an image of an original Braille document;
a processor configured to detect a plurality of Braille cells from the scanned image of the original Braille document, determine a coordinate for each respective one of the plurality of Braille cells, and associate each respective one of the plurality of Braille cells with a code; and
an embosser configured to create an embossed copy of the original Braille document based on the determined coordinate and the associated code of each respective one of the plurality of Braille cells, wherein:
the scanner, the processor, and the embosser are integrated in a unitary machine;
the processor is configured to automatically detect whether the original Braille document is a one-sided document or a two-sided document; and
the scanning, the detecting, and the creating preserves a layout of the original Braille document in the embossed copy of the original Braille document.

9. The system of claim 8, wherein:
the associating each respective one of the plurality of Braille cells with the code comprises assigning the code to the respective one of the plurality of Braille cells based on a lookup table;
the detecting comprises segmenting the pixels of the scanned image of the original Braille document into three modes based on determined thresholds, wherein the thresholds are determined by applying stability thresholding using a Beta distribution;
the three modes comprise: a first mode corresponding to a dark region of a Braille dot; a second mode corresponding to a background; and a third mode corresponding to a light region of a Braille dot;

the processor is further configured to at least one of:
convert the scanned image of the original Braille document to grayscale;
crop the scanned image of the original Braille document; and
rotate the scanned image of the original Braille document; and the processor communicates cell coordinates and an ASCII code for each cell to the embosser.

* * * * *